Patented Oct. 20, 1936

2,057,717

UNITED STATES PATENT OFFICE 2,057,717

PROCESS OF TREATING RUBBER SURFACES AND ARTICLES PRODUCED THEREBY

Roscoe H. Gerke, Nutley, N. J., assignor, by mesne assignments, to United States Rubber Company, New York, N. Y., a corporation of New Jersey No Drawing. Application May 4, 1933, Serial No. 669,365

15 Claims. (Cl. 91—68)

This invention relates to a process of treating a rubber surface, and more particularly to superficially finishing a rubber surface to produce a flexible hardened slip-finish on the same.

Various methods are in commercial practice for producing a hardened slip-finish on the surface of various rubber articles and materials. One method, primarily used in the treatment of calendered and spread rubber fabrics to provide the characteristic leather-like slip or feel of finished leather, is illustrated in the patent to Dennison 1,532,234 wherein the rubber coated material, primarily a rubber coated fabric material, is treated with a solution of bromine in organic solvent, and vulcanized. The patent to Rice 1,817,323 describes a process of treating a coating of rubber deposited directly from an aqueous dispersion of rubber such as latex with an organic solvent solution of sulphur chloride and/or bromine to harden the same so that the surface may take an embossing operation, and then subsequently embossing, and vulcanizing the rubber. The processes described in the Dennison and Rice patents are satisfactory for producing the desired results, but the treatments are expensive and must be accurately controlled. It is relatively easy to over-halogenate a surface by these processes. Generally the halogenation treatment itself will darken the color of the rubber surface, especially of brightly colored rubber surfaces, such as are used for various raincoat and slicker materials. Unless very careful control is maintained in surface hardening processes with solvent solutions of halogen materials, streaking may result with consequent damaging of the treated material. The halogen-treated surfaces are also susceptible to serious discoloration upon exposure to heat or sunlight, even to the point of turning dark brown or black when the halogen treatment has been too intensive. In addition, the use of organic solvents is open to obvious objections, such as expense, health hazard, etc.

The present invention relates to the treatment of rubber surfaces, and more particularly surfaces of the solids deposit of an aqueous dispersion of rubber such as latex, to produce a flexible hardened slip-finish on the same by a relatively rapid economical process which does not darken the original color of the rubber film, and which is relatively difficult to overtreat.

According to the present invention the rubber surface of an article comprising a rubber compound which preferably contains less than 3 parts of combined sulphur per 100 parts of rubber, is treated with a material containing sulphuric acid as the major ingredient thereof, for a short period of time, preferably for from 10 seconds or less up to one or two minutes. The action of the acid is then terminated immediately by washing the thus treated surface with water and/or aqueous alkali such as caustic soda or ammonia solutions. The surface is then dried. The rubber surface to be treated may be vulcanized or unvulcanized, and in the latter case vulcanization may be made to take place after the treatment as by an air curing operation, the hardening effect being retained through the vulcanization operation. In treating the rubber surface with such sulphuric acid material according to the present invention it is desirable to first clean the surface since the sulphuric acid less readily produces the desired finish on a surface which contains oily materials, waxes, or the like.

For the treatment of rubber articles having a low volume loading of fillers, or for rubber articles in general which are devoid of fillers that are attacked by sulphuric acid, a satisfactory sulphuric acid material is ordinary concentrated sulphuric acid of 66° Bé. In other cases it has been found that the treatment with such concentrated acid results in the formation of a white deposit in the surface of the rubber. In such cases, and for general use, it is preferred to use sulphuric acid containing a suitable diluent. Water is a suitable diluent, mixtures of sulphuric acid and water containing not less than 75% of 66° Bé. sulphuric acid (by volume) being effective. Greatly improved results are obtained by the use of sulphuric acid diluted with water-soluble organic liquids, such as methyl alcohol, ethyl alcohol, isopropyl alcohol, and polyhydric alcohols such as glycerol and ethylene glycol, with or without the addition of a small amount of water. Such mixtures may contain up to 35% of diluent by volume. The best results have been obtained by the use of mixtures including glycerol or ethylene glycol as diluents, as no whitening of the rubber surface has been observed with such mixtures. A further advantage in the use of organic diluents is the improved wetting properties of the resulting mixtures with respect to rubber surfaces, insuring uniformity of action over the entire rubber surface treated. For example, suitable compositions containing sulphuric acid and a water-soluble organic liquid may be obtained by the admixture of about 20 parts of glycerol or ethylene glycol with about 80 parts of 66° Bé. sulphuric acid (parts by volume). A suitable composition containing sulphuric acid and a water-soluble organic liquid together with a small amount of water may be obtained by the admixture of about 15 parts of glycerol or ethylene glycol and about 5 parts of water with about 80 parts 66° Bé. sulphuric acid (parts by volume).

The present invention is especially applicable to thin films of rubber deposited from latex, such as latex coated fabric materials, and for the production of a smooth flexible hardened surface on electrical conductors, or other filamentary materials such as fibrous yarns and cords, coated with rubber directly from latex. The invention is also eminently adapted to surface treatment of various rubber surfaces, more particularly vulcanized rubber surfaces whether the article on which the surface forms a part has been produced by a spreading, calendering, extruding, or molding operation. As above stated, the invention is also applicable to the treatment of air curing stocks prior to vulcanization. Practical uses of the invention will readily occur, such as the treatment of rubberized raincoat fabrics, leatherette fabrics for garments, artificial leather for such as upholstery seats and book bindings, and hot water bottles, rubber gloves, automobile tires, inner tubes, and the like. In most of these applications, it is the low coefficient of friction or slip produced by the treatment which is the predominantly desired physical characteristic, whereas in other of these applications the desirable effect is the enhanced appearance of the finished article due to the glossy smooth surface. The treatment with the sulphuric acid material produces no darkening of the original color of the rubber. The darkening, if any, resulting from exposure to sunlight, is substantially less than when halogenation is employed. Moreover, rubber surfaces treated according to the invention are unaffected by heat, becoming neither soft, nor brittle, nor discolored. The action of the sulphuric acid upon the surface of the rubber is apparently to form thereon a superficial layer of a reaction product of rubber and sulphuric acid, said layer being integral with the underlying rubber and being extremely resistant to separation and/or disintegration upon repeated flexing of the thus treated rubber article. The surface finish is thus both flexible and durable. Such characteristics cannot be obtained by coating a rubber surface with a solution of a preformed reaction product of rubber and sulphuric acid, as the surface film resulting from such treatment has been found to powder or disintegrate when subjected to repeated rubbing or flexing, and is also liable to become soft and sticky under the influence of heat, particularly at temperatures above about 80° C., and is therefore wholly unsuited to the uses for which the present invention is intended.

The successful treatment of a rubber surface according to the present invention in the case of vulcanized stocks is limited by the amount of combined sulphur. If the combined sulphur in the vulcanized rubber amounts to 3% or over (on the rubber content), the treatment results in a product having a surface which is so weak or brittle that it cracks on bending. In order to give a flexible non-cracking surface, the vulcanized rubber should therefore contain less than 3% of combined sulphur on the rubber content, whether vulcanization is made to precede or to follow the sulphuric acid treatment. The process of treating the rubber surface with the sulphuric acid material before vulcanization, and subsequently vulcanizing, is of less importance in practice than the treatment of a vulcanized surface, although either course may be adopted with satisfactory results.

In view of the many changes and modifications that may be made without departing from the principles underlying the invention, reference should be made to the appended claims for an understanding of the scope of the invention.

Having thus described my invention, what I claim and desire to protect by Letters Patent is:

1. A process of producing a flexible hardened slip-finish on a surface of the solids deposit of an aqueous dispersion of rubber which comprises treating said surface with a mixture comprising concentrated sulphuric acid and a water-soluble aliphatic alcohol for a short period of time.

2. A process of producing a flexible hardened slip-finish on a rubber surface which comprises treating said surface with a mixture comprising sulphuric acid and a water-soluble aliphatic alcohol for a short period of time.

3. A process of producing a flexible hardened slip-finish on a rubber surface which comprises treating said surface with a mixture comprising sulphuric acid and a polyhydric alcohol having not more than three carbon atoms for a short period of time.

4. A process of producing a flexible hardened slip-finish on a rubber surface which comprises treating said surface with a mixture comprising sulphuric acid and glycerol for a short period of time.

5. A process of producing a flexible hardened slip-finish on a surface of the solids deposit of an aqueous dispersion of rubber which comprises treating said surface with a mixture comprising sulphuric acid and a polyhydric alcohol having not more than three carbon atoms for a short period of time.

6. A process of producing a flexible hardened slip-finish on a surface of rubber containing less than three parts of combined sulphur per 100 parts rubber which comprises superficially treating said surface with a mixture comprising a major proportion of concentrated sulphuric acid and a minor proportion of a water-soluble aliphatic alcohol for a short period of time.

7. A process of producing a flexible hardened slip-finish on a surface of vulcanized rubber containing less than three parts of combined sulphur per 100 parts rubber which comprises superficially treating said surface with a mixture comprising a major proportion of concentrated sulphuric acid and a minor proportion of a polyhydric alcohol having not more than three carbon atoms for a short period of time.

8. A process of producing a flexible hardened slip-finish on a surface of rubber containing less than three parts of combined sulphur per 100 parts rubber which comprises superficially treating said surface with a mixture comprising a major proportion of concentrated sulphuric acid and a minor proportion of glycerol for a short period of time.

9. An article having at least a surface portion thereof comprising vulcanized rubber containing less than three parts of combined sulphur per 100 parts rubber, said rubber being vulcanized and having a flexible hardened slip-finish imparted thereto by a superficial treatment with a mixture comprising sulphuric acid a water-soluble aliphatic alcohol.

10. An article having at least a surface portion thereof comprising the solids deposit of an aqueous dispersion of rubber having a flexible hardened slip-finish imparted thereto by a superficial treatment with a mixture comprising sulphuric acid and a water-soluble aliphatic alcohol.

11. An article having at least a surface portion thereof comprising rubber having a flexible hardened slip-finish imparted thereto by a superficial treatment with a mixture comprising sulphuric acid and water-soluble aliphatic alcohol.

12. An article having at least a surface portion thereof comprising rubber having a flexible hardened slip-finish imparted thereto by a superficial treatment with a mixture comprising sulphuric acid and a polyhydric alcohol having not more than three carbon atoms.

13. An article having at least a surface portion thereof comprising the solids deposit of an aqueous dispersion of rubber having a flexible hardened slip-finish imparted thereto by a superficial treatment with a mixture comprising sulphuric acid and glycerol.

14. An article having at least a portion thereof of vulcanized rubber containing less than three parts of combined sulphur per 100 parts of rubber, said rubber having a superficial layer of the reaction product of rubber and a mixture comprising sulphuric acid and a water-soluble aliphatic alcohol integral therewith.

15. An article having at least a portion thereof of rubber of the solids deposit of an aqueous dispersion of rubber, said rubber having a superficial layer of the reaction product of rubber and a mixture comprising sulphuric acid and a water-soluble aliphatic alcohol integral therewith.

ROSCOE H. GERKE.